United States Patent [19]

Oneda et al.

[11] Patent Number: 4,987,553

[45] Date of Patent: Jan. 22, 1991

[54] STRAIGHT LINE DRAWING CONTROL APPARATUS

[75] Inventors: Shogo Oneda, Yokohama; Yoshiaki Hanyu, Tokyo, both of Japan

[73] Assignee: Ricoh Company, Ltd., Japan

[21] Appl. No.: 458,515

[22] Filed: Dec. 28, 1989

[30] Foreign Application Priority Data

Jan. 9, 1989 [JP] Japan .................................... 1-1216

[51] Int. Cl.$^5$ ................................................ G06K 1/00

[52] U.S. Cl. ...................................... 364/521; 340/799

[58] Field of Search ................ 364/518, 521; 340/723, 340/724, 799

[56] References Cited

U.S. PATENT DOCUMENTS 4,303,986 12/1981 Lars .................................... 364/900

4,788,536 11/1988 Tanabe ............................... 340/703

*Primary Examiner*—Arthur G. Evans

*Attorney, Agent, or Firm*—Mason, Fenwick & Lawrence

[57] ABSTRACT

A straight line drawing control apparatus includes a first first-in first-out memory for inputting coordinate data indicative of coordinates of a straight line to be drawn in synchronism with a first write clock and inputting write data relating to luminance and/or color of the straight line in synchronism with a second write clock and for outputting the coordinate data in synchronism with a first read clock and outputting the write data in synchronism with a second read clock. The coordinate data, the write data and the first and second write clocks are supplied from an external device. The apparatus further includes a second first-in first-out memory for inputting flag data indicating a change of the write data in synchronism with the first clock and for outputting the flag data in synchronism with the first read clock, and a controller for generating the first read clock and for generating the second read clock only when the flag data is supplied from the second first-in first-out memory.

15 Claims, 12 Drawing Sheets

STRAIGHT LINE DRAWING CONTROL APPARATUS

BACKGROUND OF THE INVENTION

The present invention generally relates to a straight line drawing control apparatus, and more particularly to write and read control of image data and address data with respect to buffers provided in a straight line drawing control apparatus.

Referring to FIG. 1, there is illustrated a conventional information processing system which has a straight line drawing control apparatus. The illustrated information processing system is composed of a host computer 1 and a straight line drawing apparatus 2. The straight line drawing apparatus 2 is made up of a host interface 3 which receives data supplied from the host computer 1, a central processing unit (hereinafter simply referred to as a CPU) 5, a straight line drawing control apparatus 6, and an image memory 7, all of which are connected to an internal bus 4. An output signal read out from the image memory 7 is fed to a printer engine 8 such as a laser beam printer.

The host computer 1 creates data relating to characters, graphics or images, and outputs the created data to the internal bus 4 through the host interface 3. Then the CPU 5 interprets the data on the internal bus 4, and derives, therefrom, coordinate data relating to the coordinates of the start and end points of a straight line to be drawn as well as write data relating to luminance and/or color of the straight line. The coordinate data and write data are sent to the straight line drawing control apparatus 6 through the internal bus 4. Then, the straight line drawing control apparatus 6 draws, in the image memory 7, a straight line defined by coordinate data $x_1$, $x_2$ and y relating to the start and end points thereof and the write data (FIG. 2). When drawing the straight line is completed, the straight line drawing control apparatus 6 reads out data relating to the drawn straight line from the image memory 7 in accordance with a corresponding instruction supplied from the CPU 5. In this manner, the straight line is printed on a print media such as paper by the printer engine 8.

FIG. 3 is a circuit diagram of the structure for the straight line drawing control apparatus 6. Referring to FIG. 3, the straight line drawing control apparatus 6 is made up of first, second and third latch circuits 11, 12 and 13, a comparator 14, a counter 15, an oscillator 16 and an AND gate 17. The write data labeled DATA supplied from the CPU 5 is written into the third latch circuit 13. The coordinate data $x_1$, $x_2$ and y which relate to the start and end points of the straight line to be drawn and are supplied from the CPU 5, are written, as preset data, into the counter 15, the first latch circuit 11 and the second latch circuit 12, respectively. The Y-coordinate data y and the write data DATA are applied to a Y-address input terminal YADR and a write data input terminal WDATA of the image memory 7 as they are. The counter 15 starts counting from the X-coordinate value $x_1$ and continues to count a clock pulse supplied from the oscillator 16 until a not-equal detection signal is supplied from the comparator 14. The comparator 14 compares the output data from the latch circuit 11 and the output data of the counter 15, and generates the aforementioned detection signal when the outputs are not identical to each other. While the counter 15 continues to count the clock pulse, a write pulse WE is output from the AND gate 17 to the image memory 7, and the not-equal detection signal is supplied, as a busy flag BUSY, to the image memory 7.

During this time, the CPU 5 operates as shown in FIG. 4. The CPU 5 periodically checks the status of the busy flag BUSY (step S1). When the busy flag BUSY is inactive, the CPU 5 sets the write data DATA in the third latch circuit 13 (step S2), and sets the coordinate data y, $x_1$ and $x_2$ in the second latch circuit 12, the counter 15 and the first latch circuit 11 (step S3). Then the CPU 5 determines whether the procedure for drawing the designated straight line is completed (step S4). When the result at step S4 is NO, the procedure returns to step S1 and checks the status of the busy flag BUSY. On the other hand, when the result at step S4 is YES, the procedure ends.

Referring to FIG. 5, there is illustrated a different conventional configuration of the straight line drawing control apparatus 6. The first, second and third latch circuits 11, 12 and 13 are replaced by a first-in first-out memory controller (hereinafter simply referred to as an FIFO controller) 18, and first, second, third and fourth first-in first-out memories (hereinafter simply referred to as FIFO memories) 19, 20, 21 and 22. The coordinate data $x_1$ (start point), $x_2$ (end point) and y are applied to the third, second and fourth FIFO memories 21, 20 and 22, respectively. The write data DATA is applied to the first FIFO memory 19. A first write clock WCLK1 derived from the CPU 5 is supplied to a write clock terminal WCLK of the second to fourth first FIFO memories 20 to 22 (the terminal WCLK is shown in common therewith for the sake of simplicity). A second write clock WCLK2 derived from the CPU 5 is applied to a write clock terminal WCLK of the first FIFO memory 19. A read clock RCLK1 derived from the FIFO controller 18 is supplied to the first to fourth FIFO memories 19 through 22 through read clock terminals RCLK thereof and to the counter 15. The read clock terminal RCLK of the second FIFO memory 20 is shown in common with the third and fourth FIFO memories 21 and 22 for the sake of simplicity. An output signal from an output terminal OUT of the second FIFO memory 20 is supplied to one (P) of the two input terminals of the comparator 14, and an output signal from an output terminal OUT of the third FIFO memory 21 is supplied to an input terminal P of the counter 15. Data indicating the X address XADR is output from an output terminal Q of the counter 15, and is then supplied to the other input terminal Q of the comparator 14 and the image memory 7. Data indicating the Y address YADR is output from an output terminal OUT of the fourth FIFO memory 22. Write data WDATA is output from an output terminal of the first FIFO memory 19.

The coordinate data $x_1$, $x_2$, and y and the write data DATA are supplied from the CPU 5 and written into the third, second, fourth and first FIFO memories 21, 20, 22 and 19, respectively, when a full flag FULL FLG from a terminal FULL of the first FIFO memory 19 is inactive. The FIFO controller 18 outputs the read clock RCLK to the first through fourth FIFO memories 19 through 22 when neither the not-equal detection signal is output nor an empty flag EMPTY FLG from a terminal EMP of the first FIFO memory 19 is active. Thereby, the coordinate data $x_1$, $x_2$ and y relating to the start point and end points of the straight line to be drawn and the write data DATA associated therewith are read out from the FIFO memories 21, 20, 22 and 19, respectively. Thereafter, the apparatus shown in FIG. 5 operates in the same manner as the apparatus shown in FIG. 3.

FIG. 6 is a flowchart of a control sequence executed by the CUP 3. The CPU 5 determines whether the full flag FULL FLG output from the first FIFO memory 19 is active (step S11). When the result at step S11 is NO, the CPU 5 sets the write data DATA into the first FIFO memory 19 (step S12), and sets the coordinate data y, $x_1$ and $x_2$ into the fourth, third and second FIFO memories 22, 21 and 20, respectively (step S13). Then the CPU 5 discerns whether drawing the straight line to be drawn is completed (step S14). When the result at step S14 is NO, the procedure returns to step S11. The aforementioned procedure consisting of steps S11 to S14 is repeatedly carried out.

However, the conventional configuration of the straight line drawing control apparatus shown in FIG. 2 has the following disadvantages. When drawing the requested straight line is not completed at step S4, the CPU 5 checks the busy flag BUSY at step S1. In this case, if the the busy flag BUSY is active, the CPU 5 must wait for the completion of drawing the straight line. Thus, during this waiting time, the CPU 5 is not permitted to execute any operation. From this reason, the configuration shown in FIG. 2 needs a long processing time.

The configuration of the straight line drawing control apparatus shown in FIG. 5 has the following disadvantages. The CPU 5 can set write data DATA in the first FIFO memory 19 until the full flag FULL FLG output from the FIFO memory 19 becomes active. However, the configuration shown in FIG. 5 needs FIFO memories each having the same number of stages for the write data DATA and the coordinate data y, $x_1$ and $x_2$. For this reason, there is a need for a large memory capacity. The write data DATA and the coordinate data $x_1$, $x_2$ and y are simultaneously written into the corresponding FIFO memories without exception. From this point of view, even when write data of a next straight line to be drawn is the same as that in the previous processing, the same write data must be written in the first FIFO memory 19 again. Such a data writing procedure causes a delay of the processing speed.

SUMMARY OF THE INVENTION

It is a general object of the present invention to provide an improved straight line drawing control apparatus in which the aforementioned disadvantages are eliminated.

A more specific object of the present invention is to provide a straight line drawing control apparatus which operates at higher speeds and needs a less memory capacity.

The above objects of the present invention are achieved by a straight line drawing control apparatus comprising first first-in first-out memory means for inputting coordinate data indicative of coordinates of a straight line to be drawn in synchronism with a first write clock and inputting write data relating to luminance and/or color of the straight line in synchronism with a second write clock and for outputting the coordinate data in synchronism with a first read clock and outputting the write data in synchronism with a second read clock. The coordinate data, the write data and the first and second write clocks are supplied from an external device. The apparatus further comprises second first-in first-out memory means for inputting flag data indicating a change of the write data in synchronism with the first clock and for outputting the flag data in synchronism with the first read clock; and control means, coupled to the first and second first-in first-out means, for generating the first read clock and for generating the second read clock only when the flag data is supplied from the second first-in first-out memory means.

The aforementioned objects of the present invention are also achieved by a straight line drawing control apparatus comprising first first-in first-out memory means for inputting write data relating to luminance and/or color of a straight line to be drawn in synchronism with a first write clock and for outputting the write data in synchronism with a first read clock; second first-in first-out memory means for inputting a first X coordinate address of a star position of the straight line in synchronism with a second write clock and for outputting the first X coordinate address in synchronism with a second read clock; third first-in first-out memory means for inputting a second X coordinate address of an end position of the straight line in synchronism with a third write clock and for outputting the second X coordinate address in synchronism with a third read clock; fourth first-in first-out memory means for inputting a Y coordinate address of the start and end positions in synchronism with a fourth write data and for outputting the Y coordinate address in synchronism with a fourth read clock; and fifth first-in first-out memory means for inputting flag data indicative of a change of the write data in synchronism with the fourth write clock and for outputting the flag data in synchronism with a fifth read clock. The first to fourth write clocks, the write data, the first and second X coordinate addresses, and the Y coordinate address are supplied from an external device. The apparatus further comprises control means, coupled to the first to fifth first-in first-out means, for generating the second to fifth read clocks and for generating the first read clock only when the flag data is output from the fifth first-in first-out memory means.

Additional objects, features and advantages of the present invention will become apparent from the following detailed description when read in conjunction with the accompanying drawings.

DESCRIPTION OF THE PREFERRED EMBODIMENTS

Figure 7:
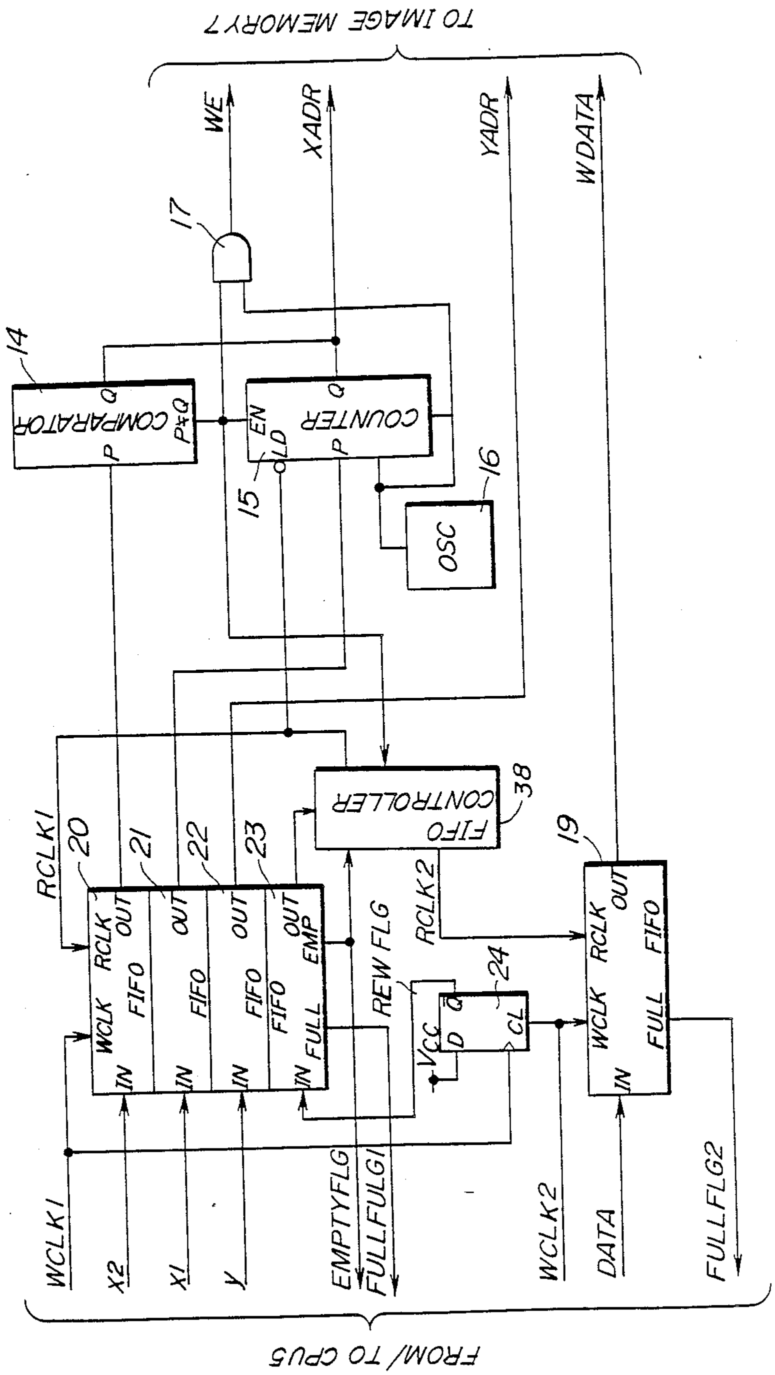
FIG. 7 is a block diagram of a straight line drawing control apparatus according to a first embodiment of the present invention.

A description is given of a first preferred embodiment of the present invention with reference to FIG. 7, which illustrates a straight line drawing control apparatus according to an embodiment of the present invention. The illustrated straight line drawing control apparatus is substituted for the apparatus 6 shown in FIG. 1. As will be described in detail later, a control procedure executed by the CPU 5 is modified in conformity with the replacement of the structure of the straight line drawing control apparatus 6. In FIG. 7, those parts which are the same as those in the previous figures are given the said reference numerals.

Figure 1:
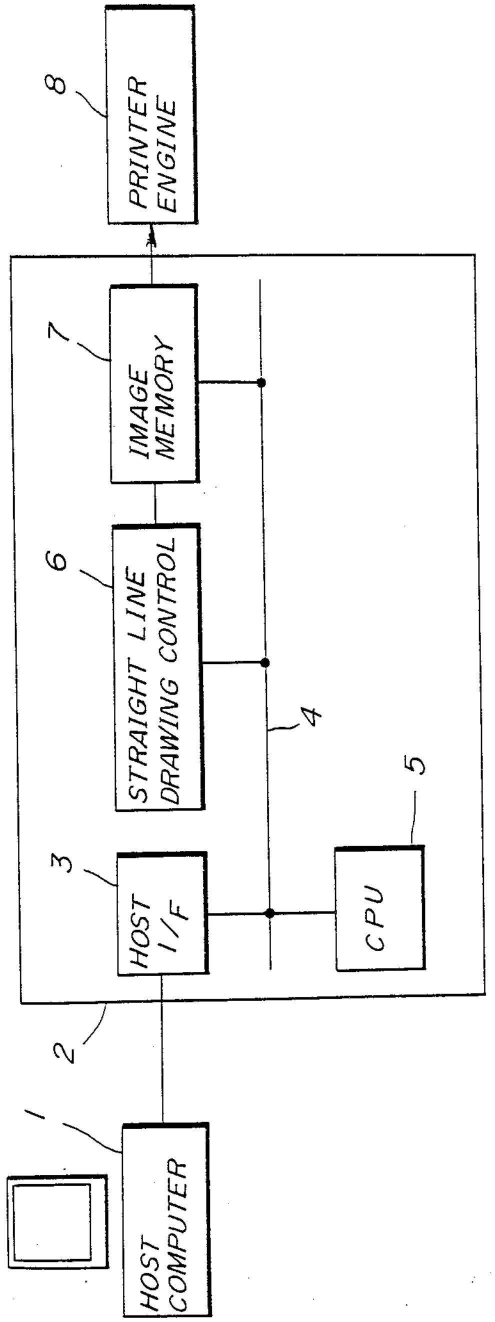
FIG. 1 PRIOR ART
FIG. 1 is a block diagram of an information processing system which uses a conventional straight line drawing control apparatus.
Figure 2:
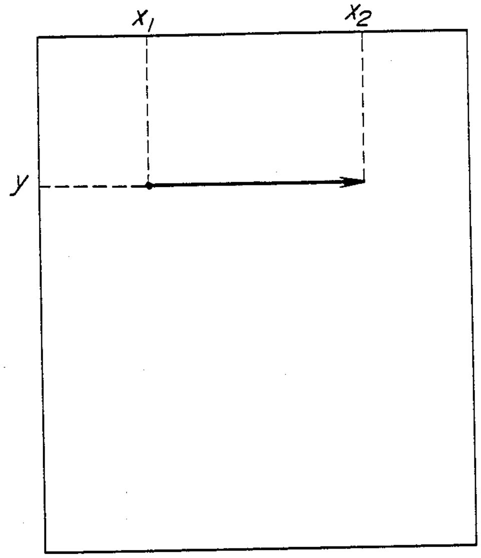
FIG. 2 is a diagram illustrating how to draw a straight line.
Figure 4:
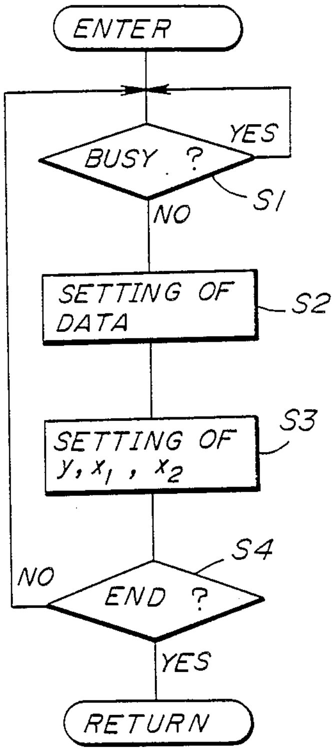
FIG.4 PRIOR ART
FIG. 4 is a flowchart illustrating a procedure executed by a central processing unit shown in FIG. 1.
Figure 3:
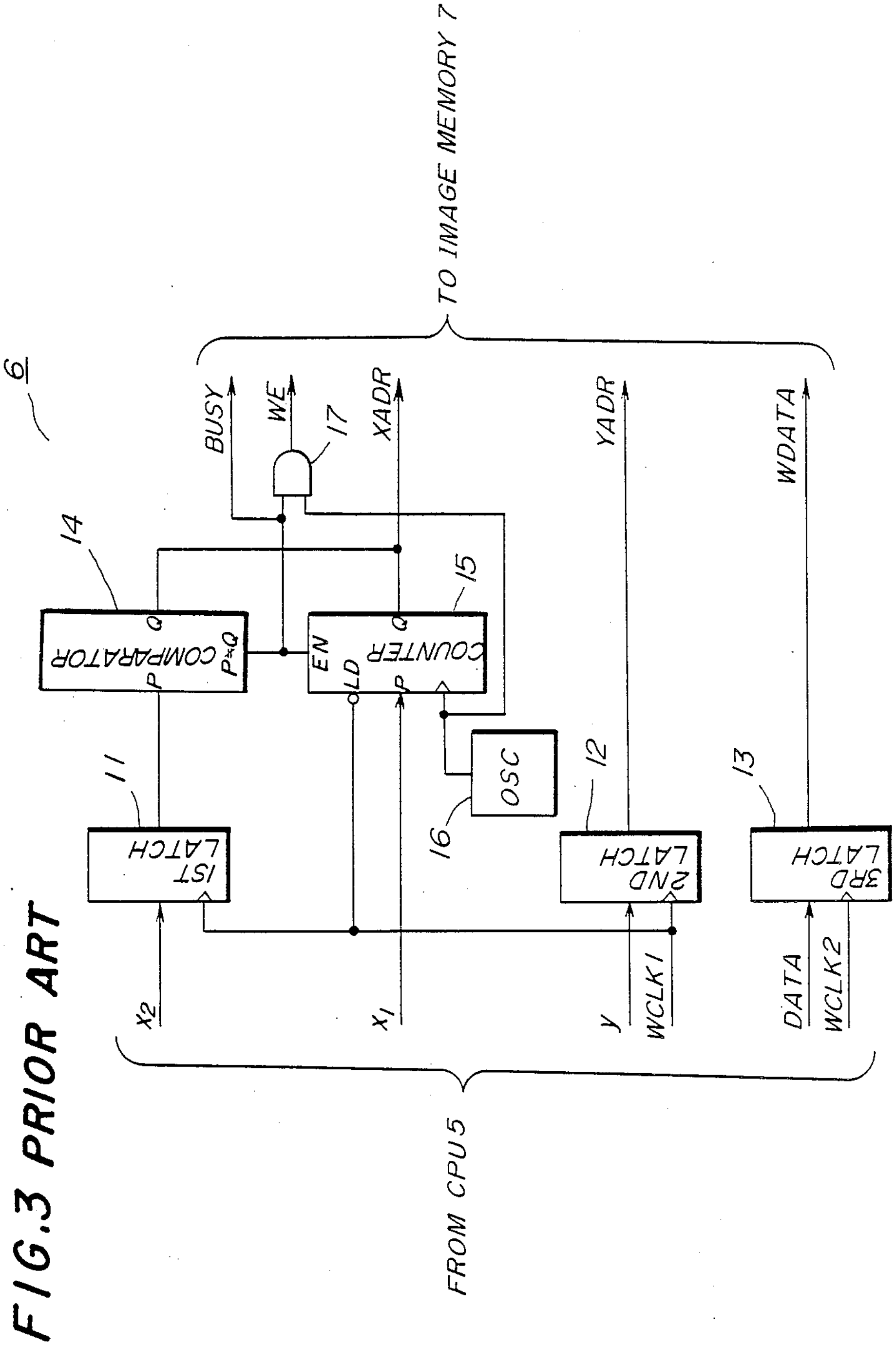
FIG.3 PRIOR ART
FIG. 3 is a block diagram of a configuration of a straight line drawing control apparatus shown in FIG. 1.

Referring to FIG. 7, the write clock terminal WCLK of the FIFO memory 19 and a clock terminal of a D-type flip-flop 24 are mutually connected and supplied with the second write clock WCLK2. A fifth FIFO memory 23 is provided in addition to th first to fourth FIFO memories 19 to 23, which operate in synchronism with the first write clock WCLK1 and the read clock RCLK1. The fifth FIFO memory 23 has an input terminal IN, a full flag terminal FULL, an empty flag terminal EMP and an output terminal OUT. Of course, the fifth FIFO memory has write and read terminals WCLK and RCLK (not shown for the sake of simplicity). The input terminal IN of the fifth FIFO memory 23 is supplied with a rewrite flag REW FLG from a $\overline{Q}$-terminal of the D-type flip-flop 24. The contents of the fifth FIFO memory 23 are drawn from the output terminal OUT thereof and then supplied to an FIFO controller 38. Each of the second to the fifth FIFO memories 20 to 23 is equipped with the full flag terminal FULL and the empty flag terminal EMP. When the second to the fifth FIFO memories 20 to 23 become full, a full flag FULL FLG1 is supplied to the CPU 5 (FIG. 1). On the other hand, when the second to the fifth FIFO memories 20 to 23 become empty, an empty flag EMPTY FLG is supplied to the CPU 5.

Figure 5:
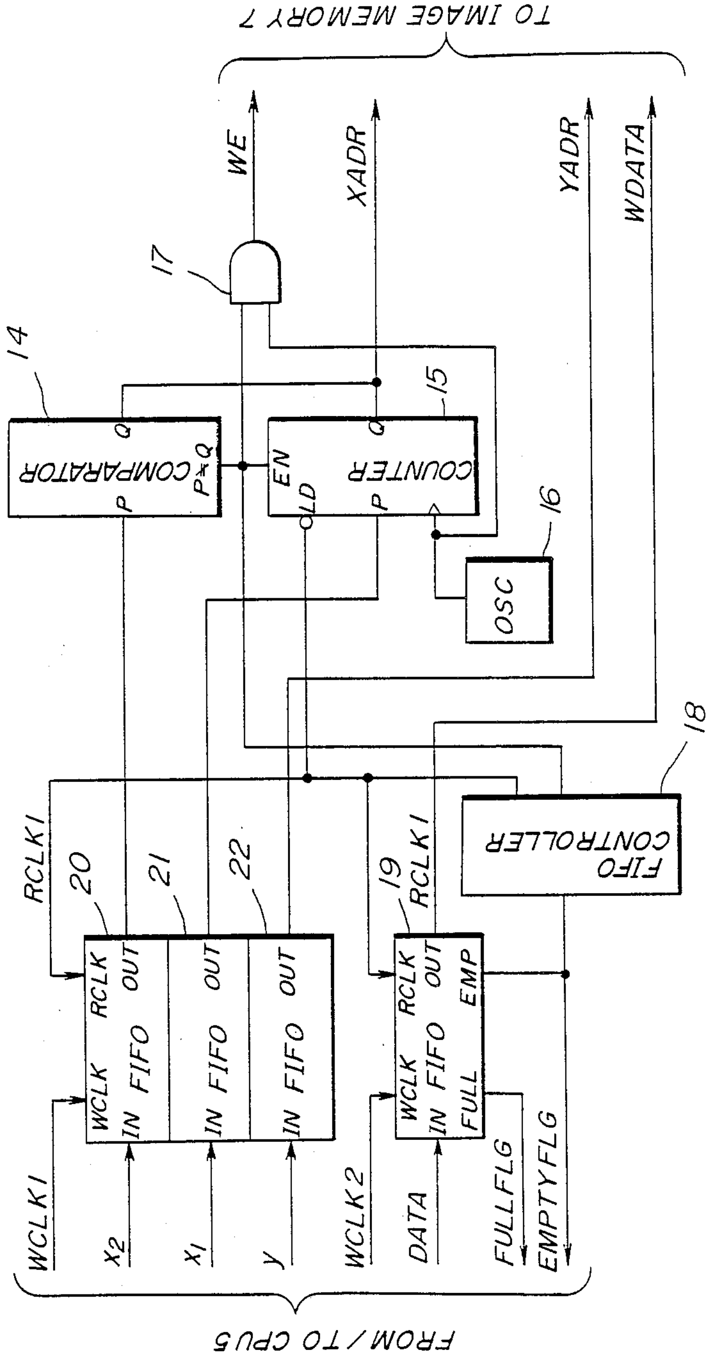
FIG.5 PRIOR ART
FIG. 5 is a block diagram of a different configuration of the straight line drawing control apparatus shown in FIG. 1.
Figure 6:
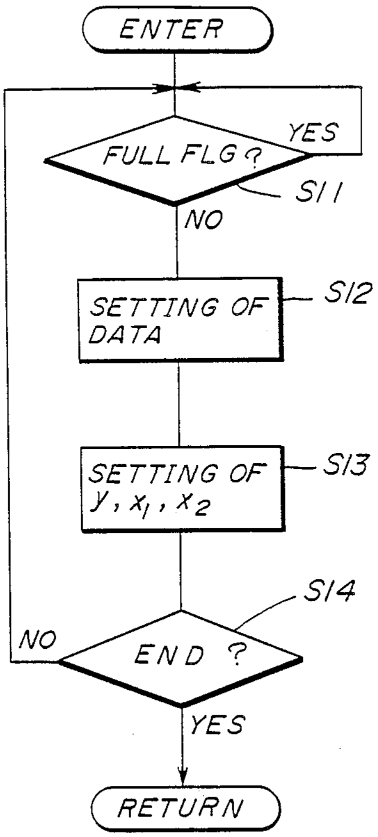
FIG. 6 is a flowchart illustrating a procedure executed by the central processing unit shown in FIG. 1.

When the FIFO memory 19 becomes full with data data DATA, a full flag FULL FLG2 is supplied from the full flag terminal FULL to the CPU 5. The other structural elements shown in FIG. 7 are the same as those in shown in FIG. 5.

Figure 8:
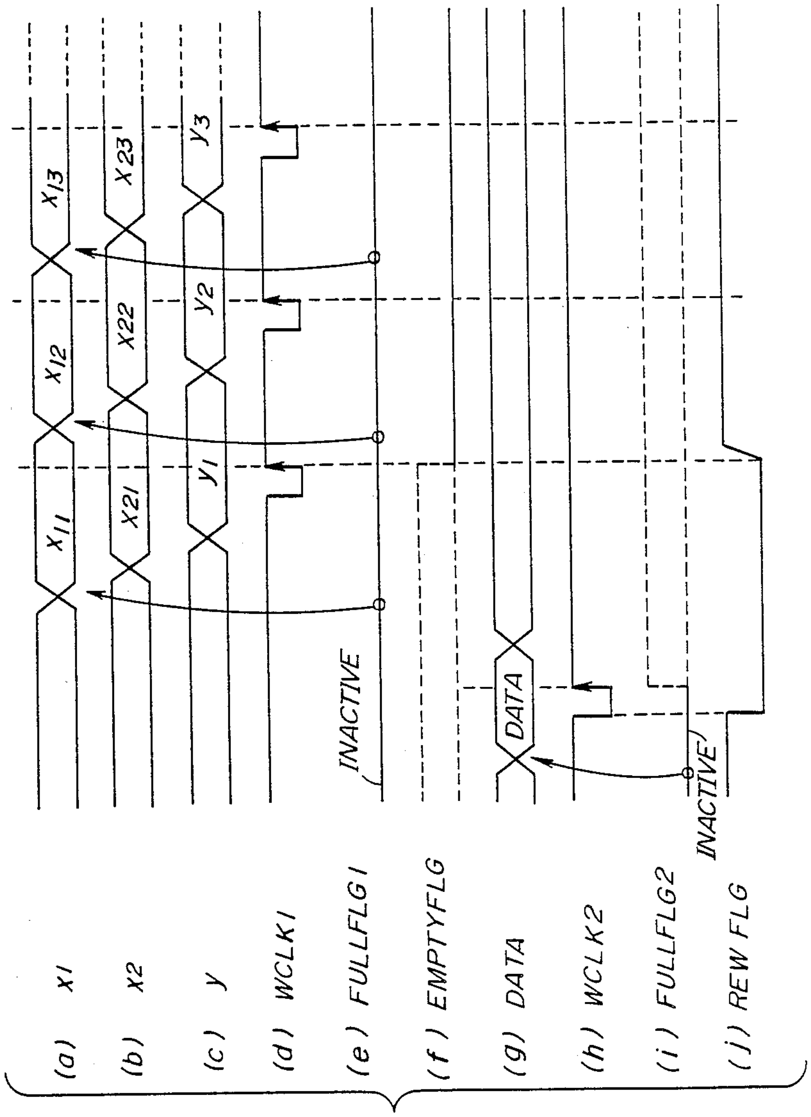
FIGS. 8 and 9 are timing charts illustrating the operation of the first embodiment.
Figure 9:
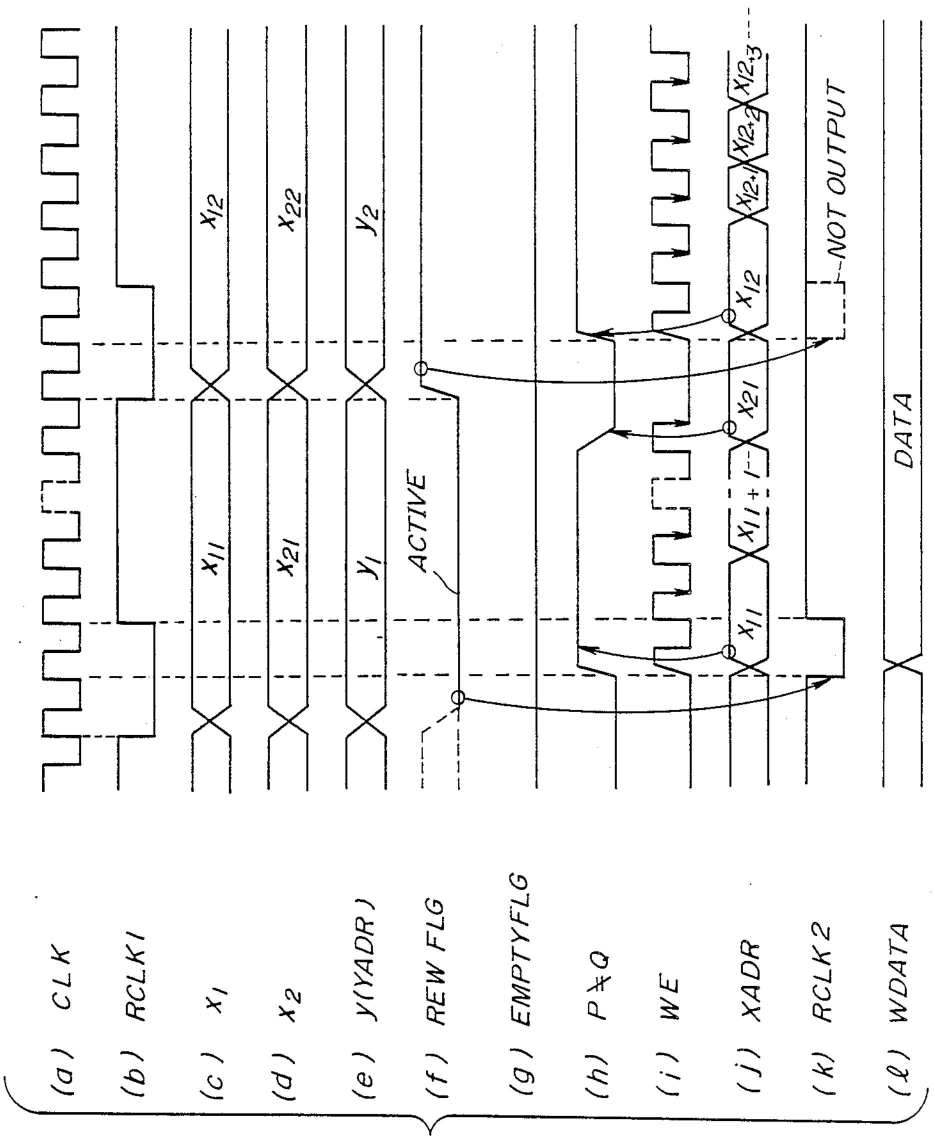

A description is given of th operation of the first embodiment with reference to FIGS. 8 and 9. The coordinate data $x_1$, $x_2$ and y supplied from the CPU 5 are written into the third, second and fourth FIFO memories 21, 20 and 23, respectively, in synchronism with the first write clock WCLK1 (FIG. 8 (a), (b), (c)). The write data DATA supplied from the CPU 5 is written into the first FIFO memory 19 in synchronism with the second write clock WCLK2 (FIG. 8 (g), (h)). Each time the second write clock WCLK2 is applied to the write clock terminal WCLK of the first FIFO memory 19, the D-type flip-flop 24 is reset so that the rewrite flag REW FLG is output therefrom (FIG. 8 (h), (j)). The appearance of the rewrite flag REW FLG indicates a change in luminance and/or color of a straight line to be drawn. As described previously, the rewirte flag REW FLG is written into or read out from the fifth FIFO memory 23 at the same timing as the second to the fourth FIFO memories 20 t0 22, the rewrite flag derived from the D-type flip-flop 24 is written into the fifth FIFO memory 23 at the same time when the coordinate data $x_1$, $x_2$ and y (FIG. 8 (a), (b), (c)) are written respectively into the third, second and fourth FIFO memories 21, 20 and 22, in synchronism with the first write clock WCLK1 (FIG. 8 (d)).

When the comparator 14 does not output the not-equal detection signal (FIG. 9 (*h*)) and the first to the fifth FIFO memories 20, 21, 22 and 23 do not output the empty flags EMPTY FLG (FIG. 9 (*g*)), the FIFO controller 38 outputs the read clock RCLK1 to the second to the fifth FIFO memories 20 to 23. Thereby, the coordinate data $x_1$, $x_2$ and y and the rewrite flag REW FLG are read out from the third, second, fourth and fifth FIFO memories 21, 20, 22 and 23, respectively (FIG. 9 (b), (c), (d), (e), (f)). At this time, if the rewrite flag REW FLG read out from the fifth FIFO memory 23 is active, the readout rewrite flag REW FLG indicates a change of the data write condition such as a change in luminance and/or color. In this case, the FIFO controller 38 outputs the second read clock RCLK2 to the first FIFO memory 19 (FIG. 9 (k)) so that the write data DATA is read out from the first FIFO memory 19 (FIG. 9 (l)). The readout Y-coordinate data y and the readout write data DATA are supplied, as the Y-address data YADR and write data WDATA, to the image memory 7 (FIG. 1) as they are (FIG. 9 (e), (l)).

On the other hand, the X-coordinate data $x_1$ and $x_2$ read out from the third and second FIFO memories 21 and 20 are supplied to the counter 15 and the comparator 14, respectively (FIG. 9 (c), (d)). The counter 15 counts the clock pulse (a) generated by the oscillator 16 from the address $x_1$ until the counted value reaches the address $x_2$. During counting, the counter 15 outputs the X address XADR to the image memory 7 (FIG. 9 (j)) and the AND gate 17 outputs the write pulse WE thereto (FIG. 9 (i)).

Figure 10:
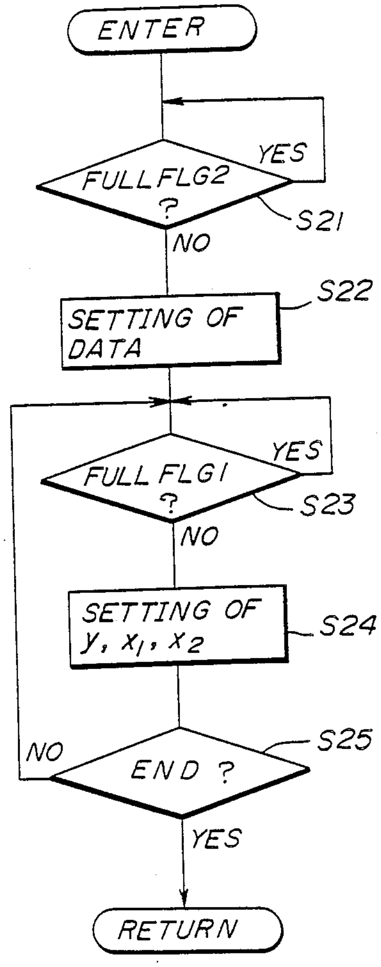
FIG. 10 is a flowchart illustrating a procedure executed by a central processing unit provided in the first embodiment of the present invention.

FIG. 10 illustrates a procedure executed by the CPU 5 when a plurality of straight lines having the same luminance or color are drawn. First, the CPU 5 checks whether the full flag FULL of the first FIFO memory 19 is active (step S21). If the result at step S21 is NO, the CPU 5 writes the write data DATA in the first FIFO memory 19 (step S22). Next, the CPU 5 checks the status of the second to the fifth FIFO memories 20 to 24 on the basis of the status of the full flag FULL FLG2 (step S23). When the full flag FULL FLG2 is inactive, the CPU 5 writes the coordinate data relating to the start and end points of a straight line to be drawn, $x_1$, $x_2$ and y into the third, second and fourth FIFO memories 21, 20 and 22, respectively (step S24). Then the CPU 5 determines whether drawing of all the requested straight lines is completed (step S25). When the result at step S25 is NO, the procedure returns to step S23, and the aforementioned procedure is repeatedly performed.

According to the first embodiment described above, it is possible for the CPU 5 to transfer the write data DATA and coordinate data $x_1$, $x_2$ and y without any waiting time until the first to the fifth FIFO memories 19 to 23 become full. In addition, after completing transfer of the write data and coordinate data, the CPU 5 can process another procedure until drawing of the straight line is actually completed. Thus, the aforementioned waiting time relating to the busy flag BUSY is eliminated, and a plurality of straight lines having the same luminance or color are drawn only by modified the coordinate data without modifying the contents of the first FIFO memory 19. Thus, it is possible to draw the straight lines with a reduced time. Further, the first FIFO memory 19 can be formed having a reduced number of stages. This is because the write data DATA may be written into the first FIFO memory 19 only when revising the contents of the first FIFO memory 19. Of course, the number of stages of the first FIFO memory 19 is less than that of the second to the fifth FIFO memories 20 to 23. It is noted that normally an FIFO memory for each of the coordinate data $x_1$, $x_2$ and y consists of 16 bits and an FIFO memory for write data consists of 8 bits or 24 bits. The rewrite flag is formed by one bit.

Figure 11:
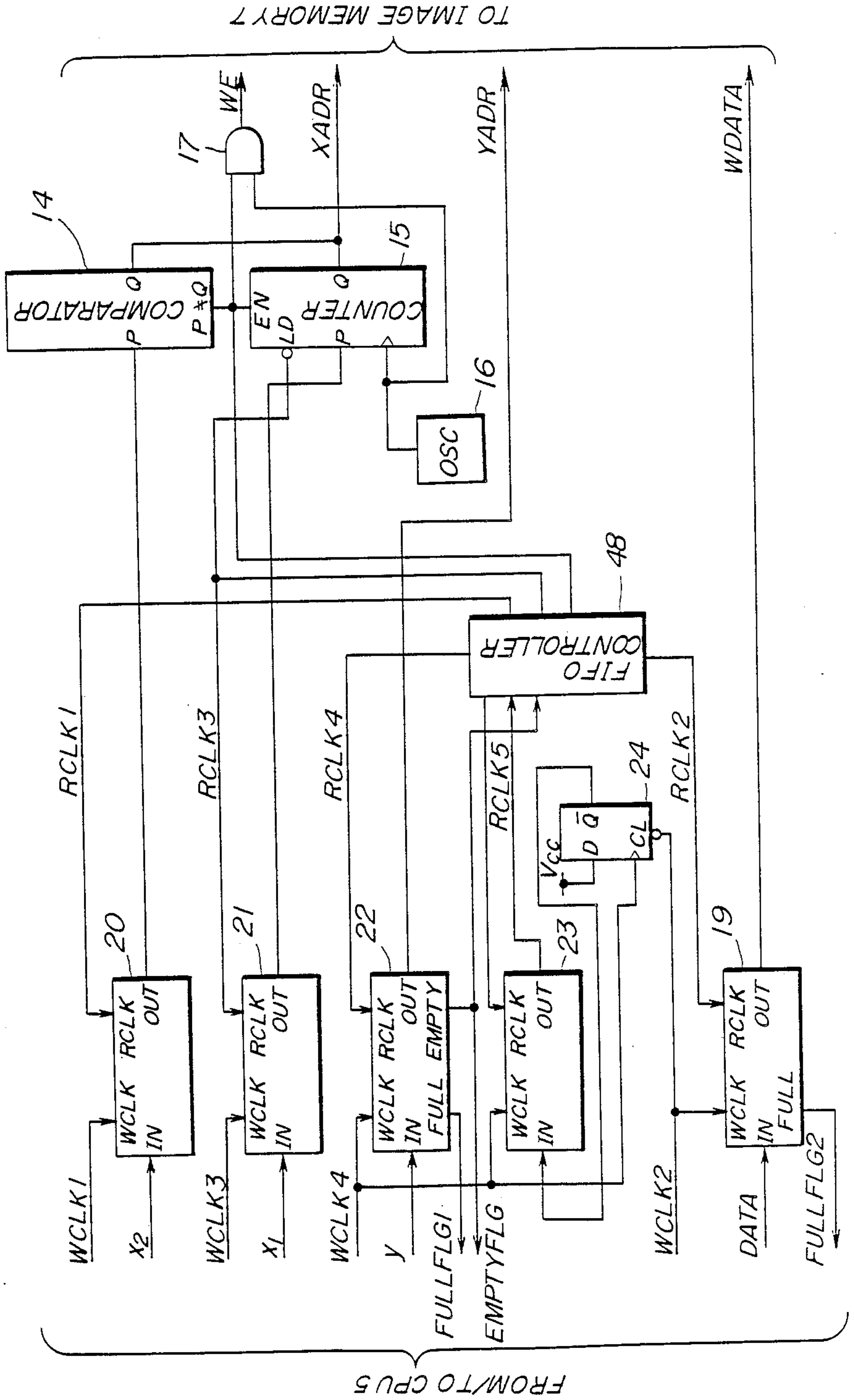
FIG. 11 is a block diagram of a second embodiment of the present invention.
Figure 12:
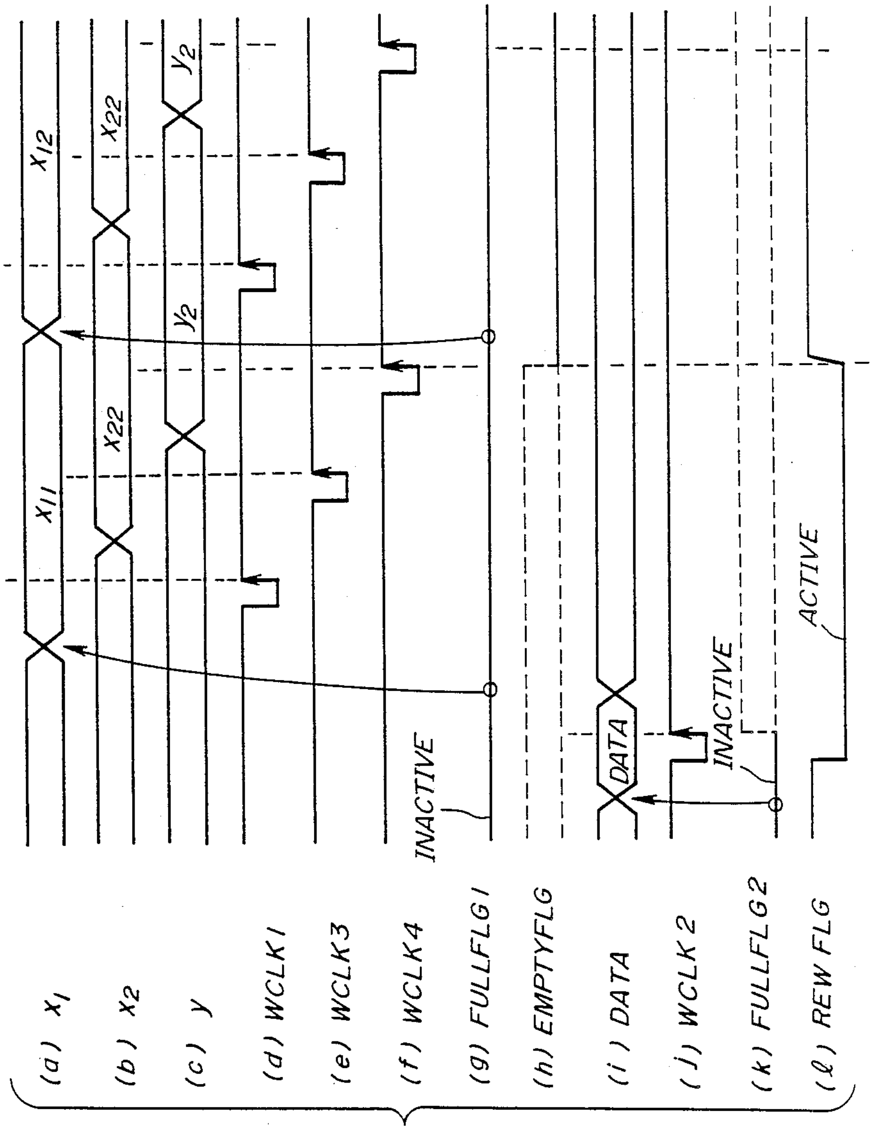
FIGS. 12 and 13 are timing charts illustrating the operation of the second embodiment.
Figure 13:
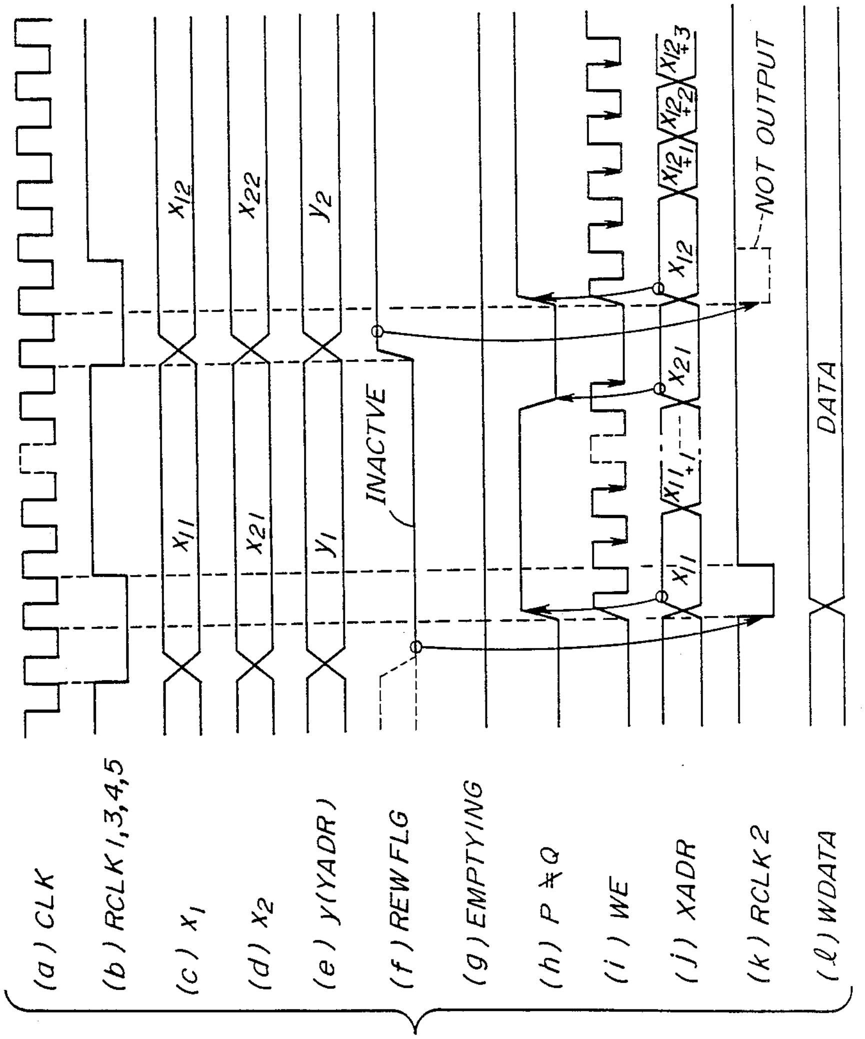

A description is given of a second embodiment of the present invention with reference to FIGS. 11 through 13. An essential feature of the second embodiment is that the second to the fourth FIFO memories 20, 21 and 22 are controlled by independent write clocks WCLK1, WCLK3 and WCLK4, respectively, and the second to the fifth FIFO memories 20 to 23 are controlled by independent read clocks RCLK1, RCLK3, RCLK4 and RCLK2, respectively. The read clock RCLK3 is also supplied to the counter 15. An FIFO controller 48 generates the first to the fifth read clocks RCLK1 to RCLK5. The write clock WCLK4 is also applied to the fifth FIFO memory 23 so that it operates in synchronism with the fourth FIFO memory 22. With this setting of the write clock, write and read of the coordinate data $x_1$, $x_2$ and y is carried out at individual timing.

As shown in (a)–(f) of FIG. 12, the coordinate data $x_1$, $x_2$ and y having delays of time are written into the third, second and fourth FIFO memories 21 20 and 22 in synchronism with the write clocks WCLK3, WCLK1 and WCLK4, respectively.

FIG. 13 illustrates signal waveforms observed when a straight line is drawn. In the illustrated case, the read clocks RCLK1, RCLK3, RCLK4 and RCLK5 have the same timing. In this case, the second embodiment operates in the same manner as the first embodiment as will be apparent from the comparison between FIGS. 9 and 13.

The present invention is not limited to the aforementioned embodiments, and variations and modifications may be made without departing from the scope of the present invention.

What is claimed is:

1. A straight line drawing control apparatus comprising:

first first-in first-out memory means for inputting coordinate data indicative of coordinates of a straight line to be drawn in synchronism with a first write clock and inputting write data relating to luminance and/or color of said straight line in synchronism with a second write clock and for outputting said coordinate data in synchronism with a first read clock and outputting said write data in synchronism with a second read clock, said coordinate data, said write data and said first and second write clocks being supplied from an external device;

second first-in first-out memory means for inputting flag data indicating a change of said write data in synchronism with said first clock and for outputting said flag data in synchronism with said first read clock; and control means, coupled to said first and second first-in first-out means, for generating said first read clock and for generating said second read clock only when said flag data is supplied from said second first-in first-out memory means.

2. A straight line drawing control apparatus as claimed in claim 1, further comprising flag data generating means for deriving said flag data from said first and second write clocks.

3. A straight line drawing control apparatus as claimed in claim 2, wherein said flag data generating means comprises a flip-flop.

4. A straight line drawing control apparatus as claimed in claim 3, wherein said second write data is supplied, as a clock signal, to said flip-flop.

5. A straight line drawing control apparatus as claimed in claim 1, wherein said first first-in first-out memory means comprises a first first-in first-out memory which stores said write data, a second first-in first-out memory which stores a first X coordinate address of a start position of said straight line, a third first-in first-out memory which stores a second X coordinate address of an end position of said straight line, and a fourth first-in first-out memory which stores a Y coordinate address of said start and end positions.

6. A straight line drawing control apparatus as claimed in claim 1, wherein said coordinate data includes a first X coordinate address of a start position of said straight line, a second X coordinate address of an end position of said straight line, and a Y coordinate address of said start and end positions, and wherein said straight line drawing control apparatus further comprises address generating means for deriving X coordinate addresses between said first and second X coordinate addresses therefrom.

7. A straight line drawing control apparatus as claimed in claim 1, wherein said flag data is one-bit data.

8. A straight line drawing control apparatus comprising:

first first-in first-out memory means for inputting write data relating to luminance and/or color of a straight line to be drawn in synchronism with a first write clock and for outputting said write data in synchronism with a first read clock;

second first-in first-out memory means for inputting a first X coordinate address of a start position of said straight line in synchronism with a second write clock and for outputting said first X coordinate address in synchronism with a second read clock;

third first-in first-out memory means for inputting a second X coordinate address of an end position of said straight line in synchronism with a third write clock and for outputting said second X coordinate address in synchronism with a third read clock;

fourth first-in first-out memory means for inputting a Y coordinate address of said start and end positions in synchronism with a fourth write data and for outputting said Y coordinate address in synchronism with a fourth read clock;

fifth first-in first-out memory means for inputting flag data indicative of a change of said write data in synchronism with said fourth write clock and for outputting said flag data in synchronism with a fifth read clock, said first to fourth write clocks, said write data, said first and second X coordinate addresses, and said Y coordinate address being supplied from an external device; and control means, coupled to said first to fifth first-in first-out means, for generating said second to fifth read clocks and for generating said first read clock only when said flag data is output from said fifth first-in first-out memory means.

9. A straight line drawing control apparatus as claimed in claim 8, wherein said second to fourth write clocks are successively supplied respectively to said second to fourth write clocks with respective delays of time.

10. A straight line drawing control apparatus as claimed in claim 8, wherein said control means generates said second to fifth read clocks at the same time.

11. A straight line drawing control apparatus as claimed in claim 8, further comprising flag data generating means for deriving said flag data from said first and fourth write clocks.

12. A straight line drawing control apparatus as claimed in claim 11, wherein said flag data generating means comprises a flip-flop.

13. A straight line drawing control apparatus as claimed in claim 12, wherein said first write data is supplied, as a clock signal, to said flip-flop.

14. A straight line drawing control apparatus as claimed in claim 8, further comprises address generating means for deriving X coordinate addresses between said first and second X coordinate addresses therefrom.

15. A straight line drawing control apparatus as claimed in claim 8, wherein said flag data is one-bit data.

* * * * *